Feb. 11, 1941.  W. R. FREEMAN  2,231,004
BRAKE CONTROL MECHANISM
Filed Aug. 7, 1939   2 Sheets-Sheet 1
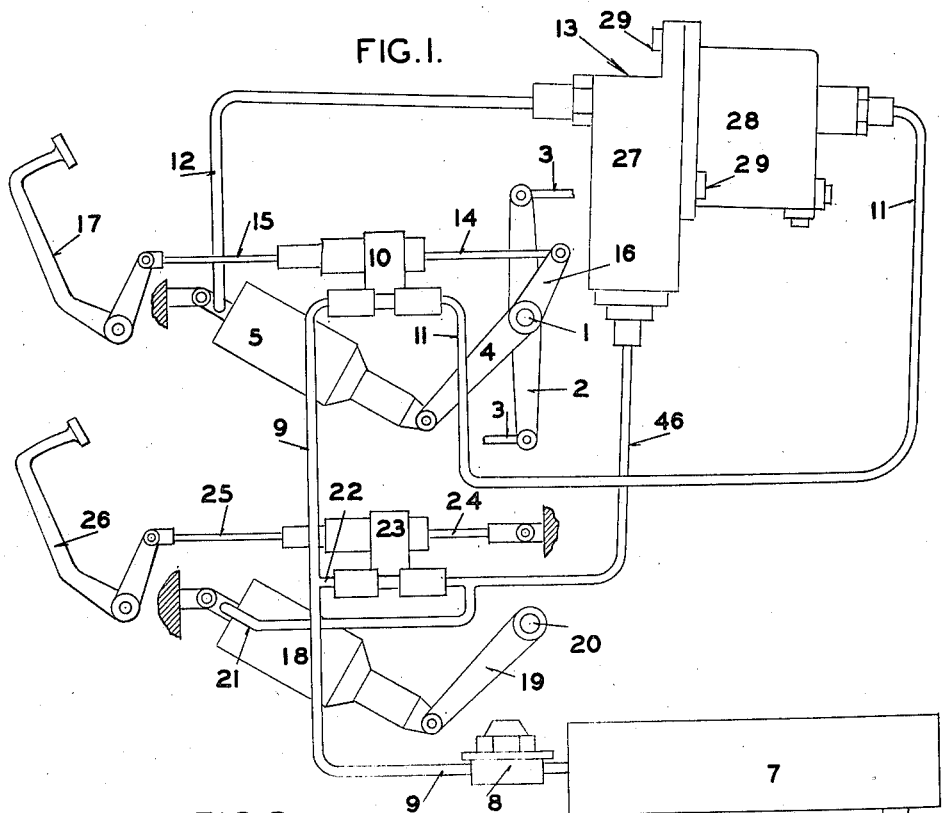
INVENTOR
W. R. FREEMAN
BY
ATTORNEY Feb. 11, 1941. W. R. FREEMAN 2,231,004
BRAKE CONTROL MECHANISM
Filed Aug. 7, 1939 2 Sheets-Sheet 2

INVENTOR
W. R. FREEMAN
BY
*E. E. Huffman*
ATTORNEY

Patented Feb. 11, 1941

2,231,004

UNITED STATES PATENT OFFICE 2,231,004

BRAKE CONTROL MECHANISM

Walter R. Freeman, University City, Mo., assignor to Wagner Electric Corporation, St. Louis, Mo., a corporation of Delaware Application August 7, 1939, Serial No. 288,711

14 Claims. (Cl. 192—13)

My invention relates to brakes and more particularly to means for holding the brakes in applied position under certain conditions.

One of the objects of my invention is to provide a holding means for brakes which is controlled by the fluid in a fluid system for actuating a clutch mechanism.

Another and more specific object of my invention is to provide a holding means for fluid pressure-actuated brakes which is so controlled by fluid pressure in a fluid pressure-actuated clutch mechanism that the brakes will only be held applied by a predetermined pressure when the holding means is effective.

Figure 4:
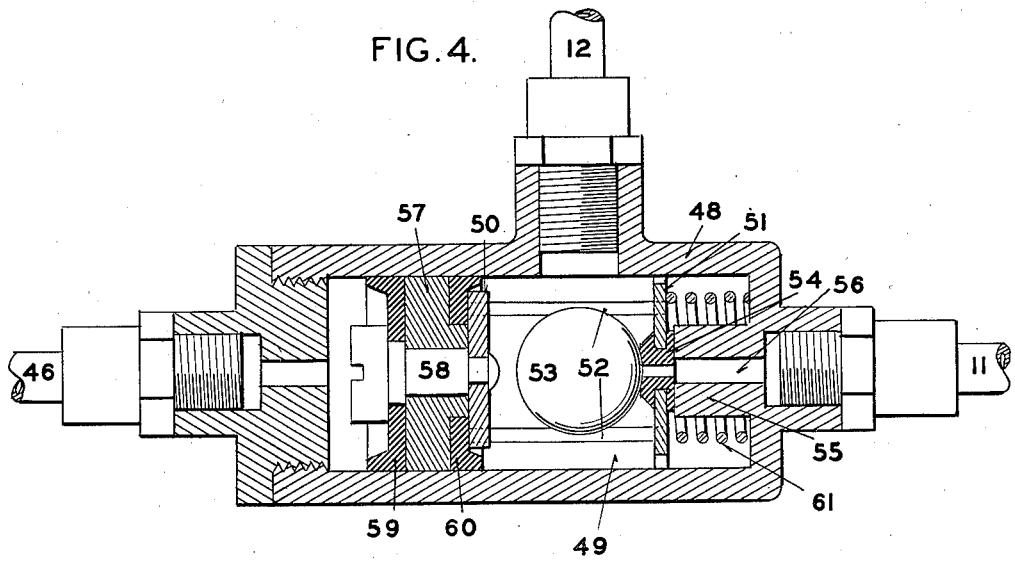
Figure 5:
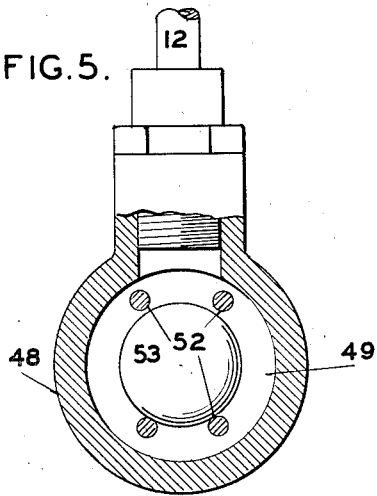

Other objects of my invention will become apparent from the following description taken in connection with the accompanying drawings in which Figure 1 is a schematic view of a fluid pressure-actuated brake system, a fluid pressure clutch operating system, and an associated brake holding means embodying my invention; Figure 2 is a cross-sectional view showing details of the brake holding valve mechanism; Figure 3 is a cross-sectional view taken on the line 3—3 of Figure 2; and Figures 4 and 5 are cross-sectional views showing a modified holding valve mechanism.

Referring to the drawings in detail, numeral 1 indicates a cross-shaft on a vehicle to which is connected by lever arms 2, rods 3 for actuating the brakes (not shown). Also secured to the cross-shaft is an arm 4 actuated by a power cylinder 5. The source of power for operating the power cylinder is air under pressure which is produced by a compressor 6 and stored in a tank 7 having a reducing valve 8 associated with its outlet. A conduit 9 leads from the tank to a control valve 10 which controls the application and release of fluid under pressure to and from the power cylinder through conduits 11 and 12 having associated therewith the brake holding valve mechanism 13. The control valve 10 is interposed between rods 14 and 15, the former being connected to an arm 16 secured to the cross-shaft 1 and the latter to a brake pedal 17 for actuating the valve. The control valve may be of any suitable type, as, for example, that shown in Stitt Patent No. 2,175,510 issued October 10, 1939.

The fluid pressure system shown for actuating the clutch mechanism comprises a power cylinder 18 for actuating a lever arm 19 secured to the usual clutch operating shaft 20. Fluid under pressure is supplied to the power cylinder through conduits 21 and 22 having associated therewith the control valve 23 (same as control valve 10) connected to a fixed support by a rod 24 and controlled by a rod 25 connected to the clutch pedal 26.

Referring particularly to Figures 2 and 3, the brake holding valve mechanism 13 comprises two casing members 27 and 28 secured together by screws 29. The member 28 is provided with a cylindrical chamber 30 communicating at one end, by means of a passage 31, with the conduit 11 leading from the control valve 10. The other end of the chamber communicates, by a passage 32 in the casing member 27, with conduit 12 leading to the brake operating power cylinder 5. Within the chamber is a cage formed of end plates 33 and 34 and rods 35. The end plate 34 carries an annular rubber valve element 36 in surrounding relation to the open end of passage 31 and in pressure engagement with the end wall of the chamber. The two lower rods 35 of the cage provide a track upon which is mounted a rolling ball 37 for cooperation with valve element 36 to prevent fluid from flowing only from the chamber to conduit 11.

The casing member 27 is also provided with a chamber 38 communicating with passage 32 by means of a passage 39 and with passage 31 by means of passages 40 and 41 to thereby provide a bypass around the valve comprising ball 37 and valve element 36. A valve seat 42 is associated with the end of the passage 39, and cooperating therewith is a piston 43 in chamber 38. The head of the piston is provided with an annular rib 44 for engagement with the valve seat to close off the bypass. A spring 45 normally biases the piston to valve open position. The portion of chamber 38 at the rear of the piston is connected by a conduit 46 with conduit 21 leading from the clutch control valve 23 to the power cylinder 18. A packing 47 is associated with the piston to prevent leakage.

In mounting the valve mechanism 13 on its support, it is so positioned that the rods 35 forming the track are at a slight angle to the horizontal when the vehicle is on a level roadway, the inclination being downward toward the rear of the vehicle so that the ball will roll to a position to engage valve element 36.

In operation, when the brakes are not applied and the clutch is engaged, the parts of the valve mechanism 13 will be in the position shown, the ball being either seated or unseated, depending upon the inclination of the track. Under these conditions the brakes may be applied or released at will by proper actuation of the brake pedal. Since the rib on piston 43 is disengaged from seat 42, the bypass is open and fluid under pressure may flow to and from the power cylinder 5 regardless of the position of the ball.

If the clutch is now disengaged by operating the control valve 23 to admit fluid under pressure to the power cylinder 18, air under pressure will also become effective on piston 43 and will cause rib 44 to engage valve seat 42, thereby closing the bypass. If the vehicle is on a level roadway or facing upwardly on an inclined roadway, the ball will be seated. The brakes can be applied at will by operating the clutch valve 10 since fluid under pressure flowing toward the power cylinder 5 can unseat the ball. However, fluid cannot flow in the opposite direction as such will be prevented by the ball. Thus the brakes will be held applied as long as the clutch is disengaged and fluid under pressure is in the clutch operating system and effective on piston 43. The release of the brake pedal will not release the brakes. When the clutch is re-engaged by releasing fluid under pressure from the power cylinder 18, piston 43 will be moved to the position shown in Figure 2 and the brakes released. Thus the brakes can be held applied when the vehicle is stopped on an inclined roadway without the necessity of the operator holding his foot on the brake pedal. The brakes will be automatically released when the vehicle is started by re-engaging the clutch. If the vehicle is moving forward along a roadway with the clutch disengaged and the brakes applied, the brakes will not be held applied by valve mechanism 13 after the brake pedal is released since the action of inertia on the rolling ball during deceleration of the vehicle will maintain the ball disengaged from the valve element 36.

The reducing valve 8 predetermines the maximum pressure of fluid which can be effective in the brake actuating system and the clutch operating system. Since this will be constant, the pressure by which the piston 43 is held in a position to cause rib 44 to engage seat 42 will be dependent on the size of the piston. This pressure also determines the fluid pressure which will be held in the power cylinder 5 since the brake fluid pressure acts on the forward end of the piston and tends to unseat it and open the bypass. It is thus seen that this arrangement provides means for predetermining the pressure with which the brakes are held applied, which pressure can be varied by varying the size of the piston. It is also to be noted that this pressure may be varied by increasing the strength of spring 45.

The control means for the brake holding valve mechanism is very useful on vehicles in which the brakes and clutch are both operated by fluid pressure. Also, the control arrangement permits the valve mechanism to be placed in the brake conduit at any point, yet easily controlled in accordance with the condition of the clutch and without any mechanical roads or other structure which may not be easily installed.

Referring to Figures 4 and 5, the modified valve mechanism comprises a casing 48 provided with a cylindrical bore 49. Positioned in the bore is a cage comprising end plates 50 and 51 connected together by rods 52, the lower two of which form a track for the ball 53. The plate 51 of the cage carries an annular rubber valve element 54 for cooperation with the ball and also for cooperation with a projection 55 on the casing, which projection is provided with an inlet passage 56 connected to the conduit 11 leading from the brake control valve 10. Also positioned in the bore is a piston 57 connected to the other end plate 50 of the cage by means of a pin 58. Suitable packing cups 59 and 60 are associated with the piston to prevent passage of fluid in either direction. A spring 61 normally biases the cage and the piston to the left as shown in Figure 4, thus freeing the valve element 54 from engagement with the end of the projection 55. The portion of the chamber within which the cage is mounted is connected to the conduit 12 which leads to the power cylinder 5 of the brake actuating mechanism and the end of the bore on the left side of the piston is connected to the conduit 46 leading to the control valve 23 of the clutch operating fluid system.

In operation when the clutch is in engaged position there will be no fluid pressure in the conduit 46 and, therefore, the cage will be positioned at the left end of the bore under the action of the spring 61. If the ball 54 under these conditions is seated against the valve element 54 by the action of gravity, fluid is free to bypass the ball controlled valve and the brakes may be applied and released at will by controlling the control valve 10 of the braking system. When the vehicle is stopped on an incline and the clutch is disengaged by operating the control valve 23, fluid under pressure will be admitted through the conduit 46 and act upon the piston 59 to move the piston and cage to the positions shown in Figure 4. Because of the inclination of the track, the ball 53 will engage the valve element 54. When the brakes have been applied, fluid under pressure will be trapped in the power cylinder and thus the brakes will be maintained applied without the necessity of holding the operator's foot upon the brake pedal. If the brakes have not been applied, they may be applied by operating the control valve 10, thereby causing fluid to flow from the conduit 11 to the the conduit 12 by unseating the ball. When fluid pressure enters the brakes and is trapped, the ball will again seat against the valve element 54 under the action of gravity. When the clutch control valve 23 is allowed to exhaust the fluid in the clutch system, the fluid pressure in the braking system and the spring will act on the piston 57 to move this piston to the left, thereby causing the valve element 54 to become disengaged from the end of the projection 55 and permitting the fluid under pressure trapped in the power cylinder to be released by by-passing around the ball-controlled valve.

If the vehicle is moving along a roadway and the brakes are applied, the action of inertia during deceleration will cause the ball to move to the left and remain disengaged from the valve element 54. Under these conditions the brakes may be applied and released at will regardless of whether the clutch is in disengaged condition. However, as soon as the vehicle is brought to a stop on an incline, the ball will again re-engage the valve element 54 under the action of gravity, and if the clutch is in disengaged condition, the valve controlling mechanism will become operative and prevent release of the brakes.

It is to be noted that the modified construction operates in the same manner as the brake controlling valve mechanism shown in Figure 1. The fluid under pressure in the clutch operating system controls the by-passing of the fluid around the ball-controlled valve by controlling the cage instead of a valve in a separate by-passing passage.

Being aware of the possibility of other modifications in the particular structure described without departing from the fundamental principles of my invention, I do not intend that its scope be limited except as set forth in the appended claims.

Having fully described my invention, what I claim as new and desire to secure by Letters Patent of the United States is:

1. In a motor vehicle provided with brakes and with clutch mechanism, a fluid system for applying and releasing the brakes, a fluid system for operating the clutch mechanism, valve means associated with the brake applying and releasing fluid system for preventing release of the brakes from applied position, a bypass around said valve means, and fluid pressure means operable by fluid in the clutch operating fluid system for closing said bypass when said system is operated to cause the clutch mechanism to be in disengaged position.

2. In a motor vehicle provided with brakes and with clutch mechanism, fluid pressure-operated means for applying and releasing the brakes, a fluid pressure-operated system for operating the clutch mechanism, valve means associated with the brake applying and releasing means for preventing release of the brakes from applied position, a bypass around said valve means, and fluid pressure means operable by fluid pressure in the clutch operating system for closing said bypass when the pressure in said system causes the clutch mechanism to be in disengaged position.

3. In a motor vehicle provided with brakes and with clutch mechanism, fluid pressure-operated means for applying and releasing the brakes, a fluid pressure-operated system for operating the clutch mechanism, valve means associated with the brake applying and releasing means for preventing release of the brakes, and means actuated by fluid under pressure in the fluid pressure clutch operating system for causing said valve means to be effective when said clutch operating system is operated to place the clutch in disengaged condition, said means being so associated with the fluid pressure means for the brakes that the fluid pressure which holds the brakes applied opposes the actuating fluid pressure of the clutch operating system.

4. In a motor vehicle provided with brakes and with clutch mechanism, fluid pressure-operated means for applying and releasing the brakes including a conduit, a fluid pressure-operated system for operating the clutch mechanism, gravity-controlled valve means associated with the conduit of the brake applying and releasing means for preventing release of the brakes from applied position, a bypass around said valve means, and fluid pressure means operable by fluid pressure in the clutch operating system for closing said bypass when the pressure in said system causes the clutch mechanism to be in disengaged position.

5. In a motor vehicle provided with brakes and with clutch mechanism, fluid pressure-operated means for applying and releasing the brakes including a conduit, a fluid pressure-operated system for operating the clutch mechanism, valve means comprising a rolling ball subject to the action of gravity and the action of inertia during deceleration of the vehicle and associated with the conduit of the brake applying and releasing means for preventing release of the brakes from applied position, a bypass around said valve means, and means operable by fluid pressure in the clutch operating system for closing said bypass when the pressure in said system causes the clutch mechanism to be in disengaged position.

6. In a motor vehicle provided with brakes and with clutch mechanism, fluid pressure-operated means for applying and releasing the brakes including a conduit, a fluid pressure-operated system for operating the clutch mechanism, valve means associated with the conduit of the brake applying and releasing means for preventing release of the brakes from applied position, a bypass around said valve means, and means comprising a movable element subject to the pressure in the clutch operating system for closing said bypass when the pressure in said system causes the clutch mechanism to be in disengaged position, said movable member also being subject to the fluid under pressure acting to hold the brakes applied and which tends to move said movable member against the fluid pressure in the clutch system and to a position causing the bypass to be opened.

7. In a motor vehicle provided with brakes and with clutch mechanism, fluid pressure-operated means for applying and releasing the brakes including a conduit, a fluid pressure-operated system for operating the clutch mechanism, gravity and inertia controlled valve means associated with the conduit of the brake applying and releasing means for preventing release of the brakes from applied position, a bypass around said valve means, and means comprising a movable element subject to the pressure in the clutch operating system for closing said bypass when the pressure in said system causes the clutch mechanism to be in disengaged position, said movable member also being subject to the fluid under pressure acting to hold the brakes applied and which tends to move said movable member against the fluid pressure in the clutch system and to a position causing the bypass to be opened.

8. In a motor vehicle provided with brakes and with clutch mechanism, a fluid pressure system for applying and releasing the brakes and comprising a source of fluid under pressure, a fluid motor, a connecting conduit and an operator operated control valve, a fluid pressure system for operating the clutch mechanism comprising a source of pressure, a fluid motor, a connecting conduit and an operator operated control valve, valve means associated with the conduit of the brake fluid pressure system for preventing return flow of fluid from the motor thereof, a bypass around said valve means, and fluid pressure means for closing said bypass by fluid under pressure in the fluid pressure operating system for the clutch mechanism when fluid under pressure is applied to its motor for causing the clutch to be in disengaged condition.

9. In a motor vehicle provided with brakes and with clutch mechanism, a fluid pressure system for applying and releasing the brakes and comprising a source of fluid under pressure, a fluid motor, a connecting conduit and an operator operated control valve, a fluid pressure system for operating the clutch mechanism comprising a source of pressure, a fluid motor, a connecting conduit and an operator operated control valve, valve means comprising a rolling ball subject to the action of gravity and to the action of inertia during deceleration of the vehicle and associated with the conduit of the brake fluid pressure system for preventing return flow of fluid from the motor thereof, a bypass around said means, and means for closing said bypass by the fluid under pressure in the fluid pressure operating system for the clutch mechanism when fluid pressure is applied to its motor for causing the clutch to be in disengaged condition.

10. In a motor vehicle provided with brakes and with clutch mechanism, a fluid pressure system for applying and releasing the brakes and comprising a source of fluid under pressure, a fluid motor, a connecting conduit and an operator operated control valve, a fluid pressure system for operating the clutch mechanism comprising a source of pressure, a fluid motor, a connecting conduit and an operator operated control valve, valve means comprising a rolling ball subject to the action of gravity and to the action of inertia during deceleration of the vehicle and associated with the conduit of the brake fluid pressure system for preventing flow of fluid from the motor thereof, a bypass around said means, a fluid motor-operated valve element for closing said bypass by the fluid under pressure in the fluid pressure operating system for the clutch mechanism when fluid pressure is applied to its motor for causing the clutch to be in disengaged condition, and a spring for normally biasing the valve element of the bypass to an open position.

11. In a motor vehicle provided with brakes and a control element, fluid pressure-operated means for applying and releasing the brakes, a fluid pressure-operated system for operating the control element of the vehicle, valve means associated with the brake applying and releasing means for preventing release of the brakes from applied position, a bypass around said valve means, and fluid pressure means operable by fluid pressure in the control element operating system for closing said bypass when the pressure in said system is such as to cause operation of said control element.

12. In a motor vehicle provided with brakes and with clutch mechanism, fluid pressure-operated means for applying and releasing the brakes, a fluid pressure-operated system for operating the clutch mechanism, valve means associated with the brake applying and releasing means for preventing release of the brakes from applied position and comprising a gravity-controlled valve, and means for causing the gravity-controlled valve to be effective when it is in closed position, said means being operable by fluid pressure in the fluid pressure clutch operating system when it is operated to cause the clutch to be in disengaged condition and being so associated with the braking system that said fluid pressure is opposed by the fluid pressure acting to hold the brakes applied.

13. In a motor vehicle provided with brakes and with clutch mechanism, fluid pressure-operated means for applying and releasing the brakes, a fluid pressure-operated system for operating the clutch mechanism, valve means associated with the brake applying and releasing means for preventing release of the brakes from applied position and comprising a valve element and a cooperating rolling ball subject to the action of gravity and the action of inertia during deceleration of the vehicle, bypass means including said valve element for permitting fluid to pass around the valve element and ball when in cooperating relationship, and means opposed by the fluid pressure acting to hold the brakes applied and operable by fluid under pressure in the fluid pressure clutch operating system for closing the bypass means.

14. In a motor vehicle provided with brakes and with clutch mechanism, fluid pressure-operated means for applying and releasing the brakes, a fluid pressure-operated system for operating the clutch mechanism, valve means associated with the brake applying and releasing means for preventing release of the brakes from applied position and comprising a chamber having an inlet provided with a valve seat, a movable annular valve element cooperating with the seat, a rolling ball subject to the action of gravity and the action of inertia during deceleration of the vehicle and adapted to engage the annular valve element, a piston connected to the annular valve element and so subject to the fluid under pressure in the brake system that it tends to unseat the annular valve element, and means operable by fluid pressure in the clutch operating system when the latter is operated for causing the piston to be moved against the fluid pressure in the brake system and seat the annular valve element.

WALTER R. FREEMAN.